INVENTOR.
JAMES W. BRUNDAGE
BY
Oberlin & Limbach
ATTORNEYS

Nov. 4, 1958  J. W. BRUNDAGE  2,858,566
TIRE CURING PRESS
Filed July 16, 1954  6 Sheets-Sheet 2

INVENTOR.
JAMES W. BRUNDAGE
BY
Oberlin & Limbach
ATTORNEYS

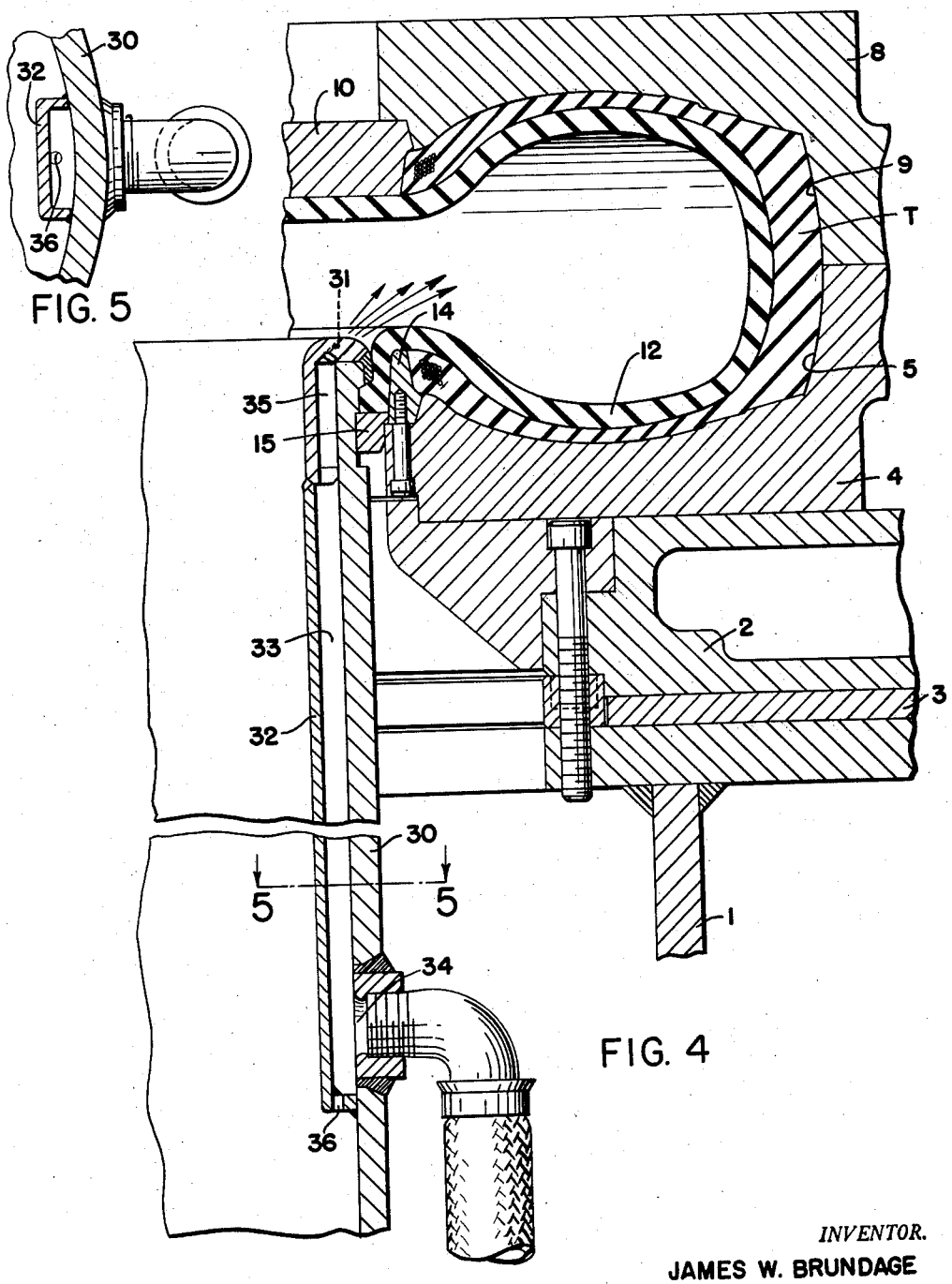

Nov. 4, 1958     J. W. BRUNDAGE     2,858,566
TIRE CURING PRESS

Filed July 16, 1954     6 Sheets-Sheet 4

*INVENTOR.*
JAMES W. BRUNDAGE
BY
Oberlin & Limbach
ATTORNEYS

INVENTOR.
JAMES W. BRUNDAGE

Nov. 4, 1958 J. W. BRUNDAGE 2,858,566
TIRE CURING PRESS
Filed July 16, 1954 6 Sheets-Sheet 6
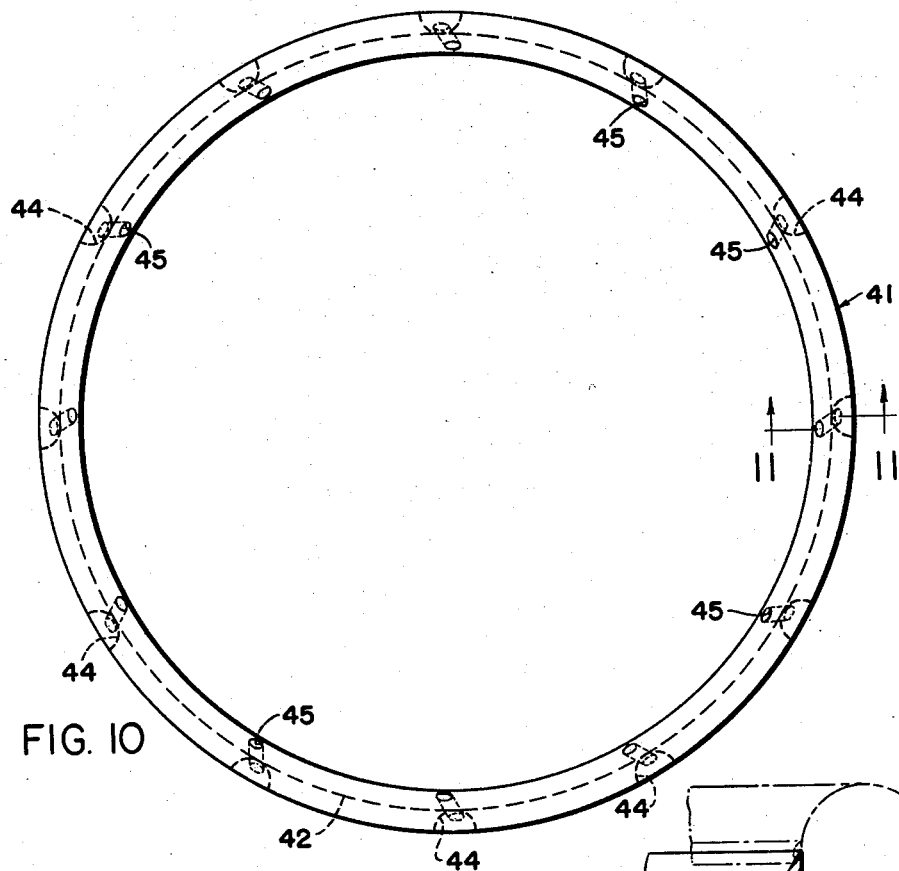
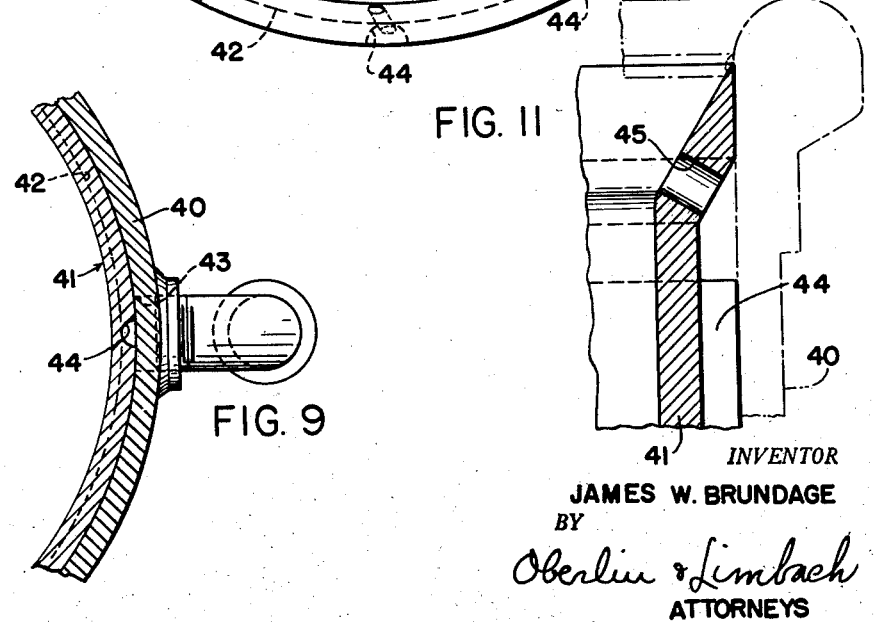
INVENTOR
JAMES W. BRUNDAGE
BY
Oberlin & Limbach
ATTORNEYS

United States Patent Office 2,858,566
Patented Nov. 4, 1958

2,858,566

TIRE CURING PRESS

James W. Brundage, Akron, Ohio, assignor to National Rubber Machinery Company, Akron, Ohio, a corporation of Ohio Application July 16, 1954, Serial No. 443,917

9 Claims. (Cl. 18—17)

The present invention relates generally as indicated to a tire curing press and more particularly to improvements in the control of the vulcanizing or curing operation thereof.

Tire curing presses of the automatic type as now known, for the most part employ a pair of complementary annular mold sections between which a green tire carcass in pulley-band form is positioned so that its beads will be engaged between the mold sections as the latter are relatively moved toward each other into mating engagement. In presses of this character, a tire shaping diaphragm, projecting axially from one mold section into the pulley-band carcass, is inflated to progressively "belly" the carcass so that it assumes nearly the final tire shape when the mold sections are in mating engagement.

Thereafter, a curing medium, such as hot water or steam, is injected under pressure into said diaphragm to exert an expanding influence on the shaped carcass and to cure or vulcanize the same in finished tire shape in the tire cavity defined by the mating mold sections; and, of course, the mold sections may be mounted on heating platens so as to subject the shaped carcass to curing from the exterior.

After the cure, a coolant such as cold water at normal room temperature or thereabout may be circulated through the diaphragm to arrest the cure; and then the coolant is drained from the diaphragm, the mold sections are separated, and, finally, either the diaphragm is withdrawn from the finished tire, or the finished tire is removed from around the diaphragm.

One disadvantage of existing tire curing presses is that the entire diaphragm must be filled with the curing medium before any substantial curing commences, and likewise when the cure is completed the coolant has to rather completely fill the diaphragm before effectively commencing the arresting of the cure and cooling of the tire. Thus, the curing and cooling cycles consume more time than necessary, and moreover it is difficult to arrest the cure at exactly the right time.

Furthermore, existing tire curing presses are not well adapted for the curing of nylin tires, because these tires need to be cooled while pressure is maintained in the diaphragm. Otherwise, the nylon tires will be distorted if the supporting pressure of the diaphragm is removed or lessened during the admission of cooling water thereinto.

It is one principal object of this invention to provide a novel tire curing press which makes a most efficient use of the curing medium and of the coolant by directing the hottest fluid or coolest fluid, as the case may be, against the tire-contacting wall of the diaphragm and/or by inducing swirling of the curing medium or coolant around the tire-contacting wall aforesaid.

It is another object of this invention to provide a tire curing press by which the curing cycle is substantially reduced.

It is another object of this invention to provide a tire curing press which provides a nicety of control for prompt arresting of the curing operation for uniformity in the curing of successive tires and a nicety of control of the time of the cure for achieving the best results.

Another object of this invention is to provide a tire curing press which is especially advantageous in the steam curing of nylon tires, in that the pressure is maintained within the diaphragm, as the cooling cycle is started, to avoid distortion of the nylon tires as aforesaid.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawing:

Fig. 4 is a fragmentary vertical cross-section view of a preferred form of diaphragm well and curing and cooling media supply arrangement;

Fig. 5 is a cross-section view taken substantially along line 5—5, Fig. 4;

Fig. 9 is a cross-section view taken substantially along line 9—9, Fig. 8;

Fig. 10 is a top plan view of the diaphragm well of Fig. 8; and

Fig. 11 is an enlarged cross-section view taken substantially along line 11—11, Fig. 10.

Figure 1:
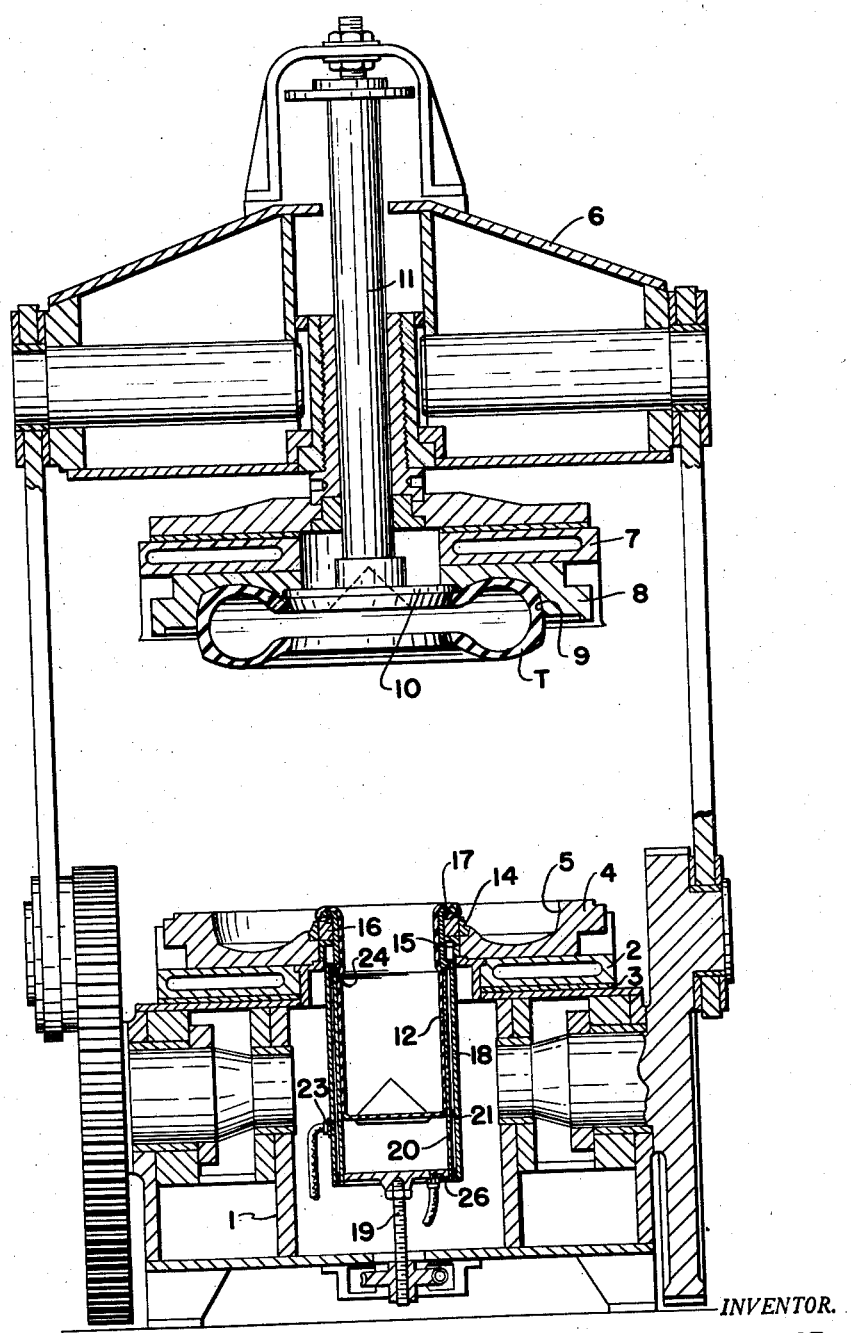
Fig. 1 is a central vertical cross-section view of a tire curing press embodying one form of the present invention, the press being shown in its fully open condition with the diaphragm invaginated into a well in the center of the bottom mold section and with the cured tire stuck in the top mold section ready for discharge therefrom.
Figure 2:
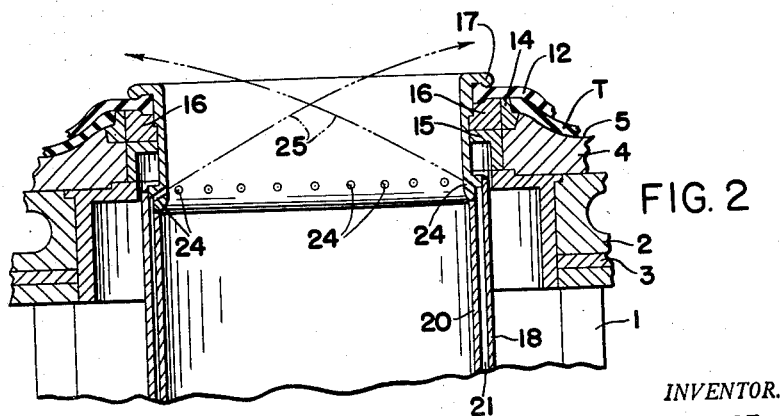
Fig. 2 is a fragmentary vertical cross-section view of the lower portion of the press of Fig. 1 drawn to larger scale and showing the diaphragm in its operative tire shaping and curing position.
Figure 6:
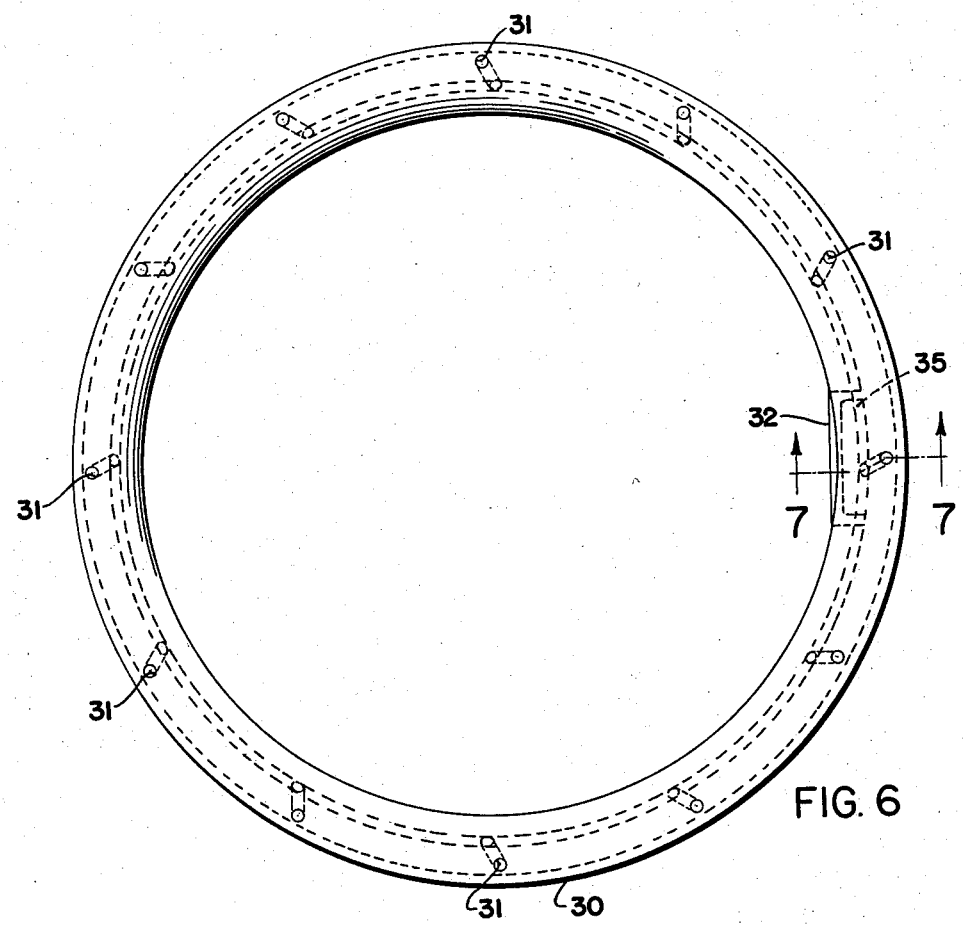
Fig. 6 is a top plan view of the Fig. 4 curing and cooling media supply arrangement.

Referring now more particularly to the drawings, and first to Figs. 1 and 2, the tire curing press as therein illustrated is essentially the same as that shown in Figs. 13–15 of my copending application Serial No. 353,354, filed May 6, 1953, wherein the hollow base 1 of the press has mounted thereon a heating platen 2 with insulating material 3 between said platen and the base and wherein an annular bottom mold section 4 is bolted or otherwise secured on said platen, said mold section 4 having a cavity 5 therein which is the counterpart of one bead, the adjacent side wall, and about one-half of the tread portion of a finished tire T. Vertically reciprocably mounted on the press is an upper press head 6 which carries an upper heating platen 7 to which is secured the downwardly facing top mold section 8 having a cavity 9 therein defining the remaining portion of the finished tire. Thus, when the top and bottom mold sections 4 and 8 are brought into mating engagement, they form a tire-shaped cavity therebetween to which shape the tire carcass is first formed and then cured or vulcanized. The mechanism for vertically reciprocating the top press head 6 may be of any desired form such as a motor-driven bull gear crank mechanism as shown herein and in the aforesaid copending application, for example.

Around the inner periphery of the top mold section 8 is a bead stripper ring 10 which is adapted to be moved downwardly with respect to the top mold section 8 to strip the finished vulcanized tire T therefrom for discharge onto a platform or suitable take-off device (not shown) which is adapted to be inserted between the separated mold sections 4 and 8. Then, within said bead stripper ring 10 is a hydraulic or pneumatic diaphragm actuator 11 which, while the mold sections are in mating engagement or are just starting to separate, may be actuated downwardly to push the diaphragm 12 down into the hollow base 1 of the press as shown in Fig. 1 to thereby peel out said diaphragm from within the shaped and cured tire T.

The bead ring 14 for the bottom mold section 4 is bolted or otherwise secured thereto, and engaged with a shoulder 15 of the bottom mold section 4 is a clamping ring 16 which cooperates with the outwardly directed flange 17 of a well member 18 to firmly clamp the bead of the shaping and curing diaphragm 12 therebetween, the well member 18 being provided at its bottom end with a threaded stud 19 arranged to be drawn downwardly as by means of a worm gear drive or the like operative to rotate an axially fixed nut threaded onto said stud 19, all as disclosed in the aforesaid application, Serial No. 353,354.

The particular improvements in the present application reside in the construction of said diaphragm well member 18 which includes an inner tubular member 20 welded or otherwise secured in place in radially spaced relation within member 18 to provide a manifold 21 in communication with an inlet port 23 for curing medium or coolant water. Leading from the upper end of said manifold 21 are a series of passages 24 from which curing and cooling fluids are alternately supplied into the tire-contacting portion of diaphragm 12 as represented by the dot-dash lines 25 in Fig. 2. Said passages 24 are preferably inclined upwardly at an angle of approximately 30° and also are preferably disposed at an angle of about 30° relative to radial lines through the axis of said well member 18, whereby curing medium or coolant issuing from said passages 24 will impinge on the upper half of the tire-contacting portion of the diaphragm 12; and, because of the last-mentioned angular disposition of the passages 24, the curing or cooling fluid will be given a swirling motion around the inside of the diaphragm 12. Even the fluid which may collect in the lower half of the tire-contacting portion of the diaphragm 12 is caused to swirl around therein.

The operation of the press will be described later in greater detail; and, therefore, it suffices to now note merely that the well member 18 has a port 26 at the bottom which serves not only as a drain for the curing medium and coolant, but also as an inlet port for air or like fluid which is adapted to be introduced into the diaphragm during the initial stages of the "bellying" or deforming of the pulley-band green tire carcass.

Figure 3:
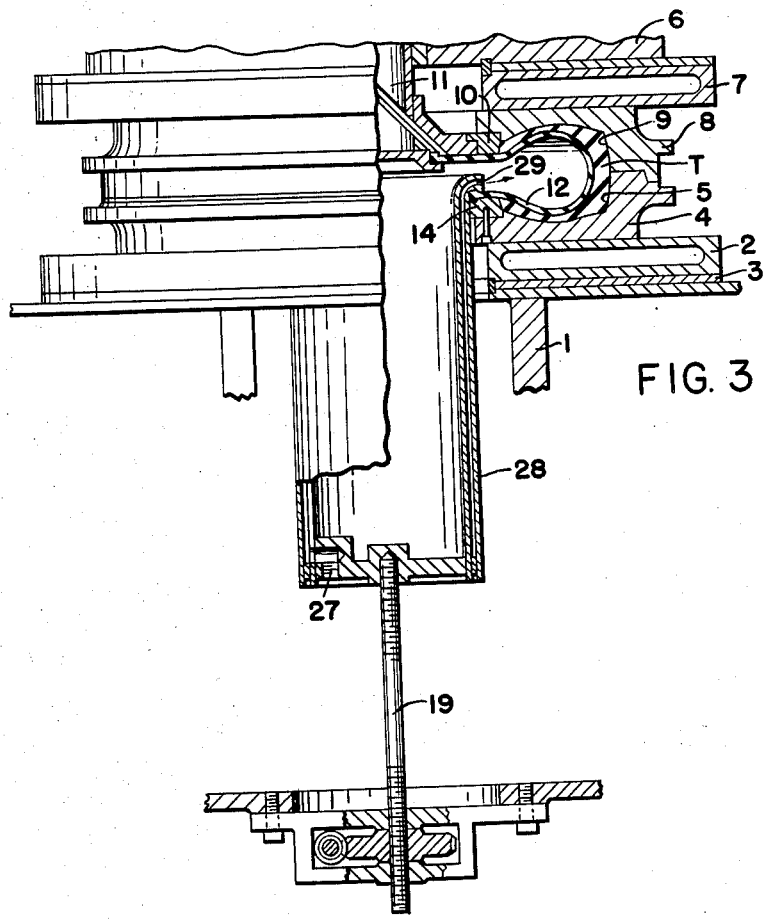
Fig. 3 is a fragmentary vertical cross-section view of a tire curing press showing another form of diaphragm well and curing and cooling media supply arrangement.

In Fig. 3, the press is shown in closed position, with curing fluid or coolant supplied directly into diaphragm 12 through inlet port 27 of the double wall well 28 and through peripheral passages 29 of said well 28. Passages 29 may be non-radial to induce swirling motion of the fluid; and, if desired, instead of separate passages 29, the fluid outlet may be an annular slit.

Referring now to Figs. 4 to 7, the well structure 30 is somewhat the same as those illustrated in Figs. 1, 2, and 3, with the exception that the curing medium and coolant supply passages 31 are angularly upwardly and outwardly directed and also are angularly directed with respect to radial lines so as to effect a swirling motion of the curing medium or coolant, as the case may be, for effecting efficient and rapid heat transfer through the wall of the diaphragm 12. In this case, a channel-shaped piece 32 is welded inside the well 30 to provide a duct 33 communicating the curing medium or coolant inlet port 34 with the manifold 35 from which passages 31 lead outwardly. A bleed hole 36 is provided to prevent accumulation of fluid in duct 33 when the diaphragm 12 is invaginated into well 30 around the rounded mouth of said well as shown in dot-dash lines in Fig. 7.

Figs. 8 to 11 illustrate a still further modification in the well structure 40 wherein the inner tubular member 41 forms an annular manifold 42 communicating with port 43 and a series of passages 44, the latter terminating in inwardly and upwardly extending discharge passages 45 to direct curing or cooling medium into diaphragm 12 and to induce swirling thereof. As in Figs. 4 to 7, a bleed passage 46 is provided.

Of course, even when the diaphragm 12 is completely filled with curing medium, and this applies to all of the Figs. 1 to 11, the discharge of fluid upwardly at an angle and non-radially establishes a current, the fluid circulating around the diaphragm 12 with the hottest fluid or the coolest fluid, as the case may be, initially contacting the inner wall of the diaphragm without necessity of first completely filling the well member and diaphragm.

Figure 7:
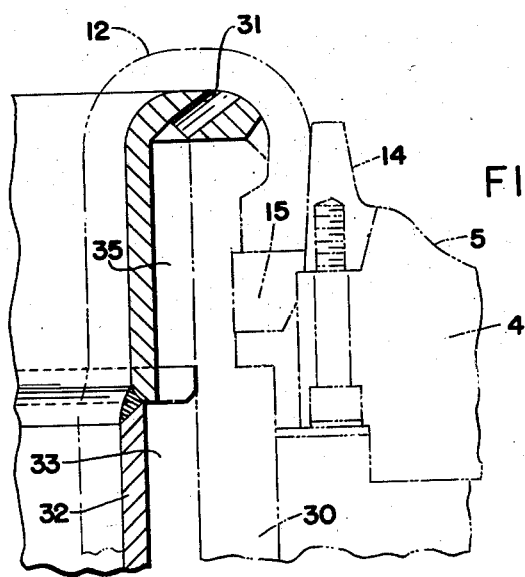
Fig. 7 is a cross-section view taken substantially along line 7—7, Fig. 6.
Figure 8:
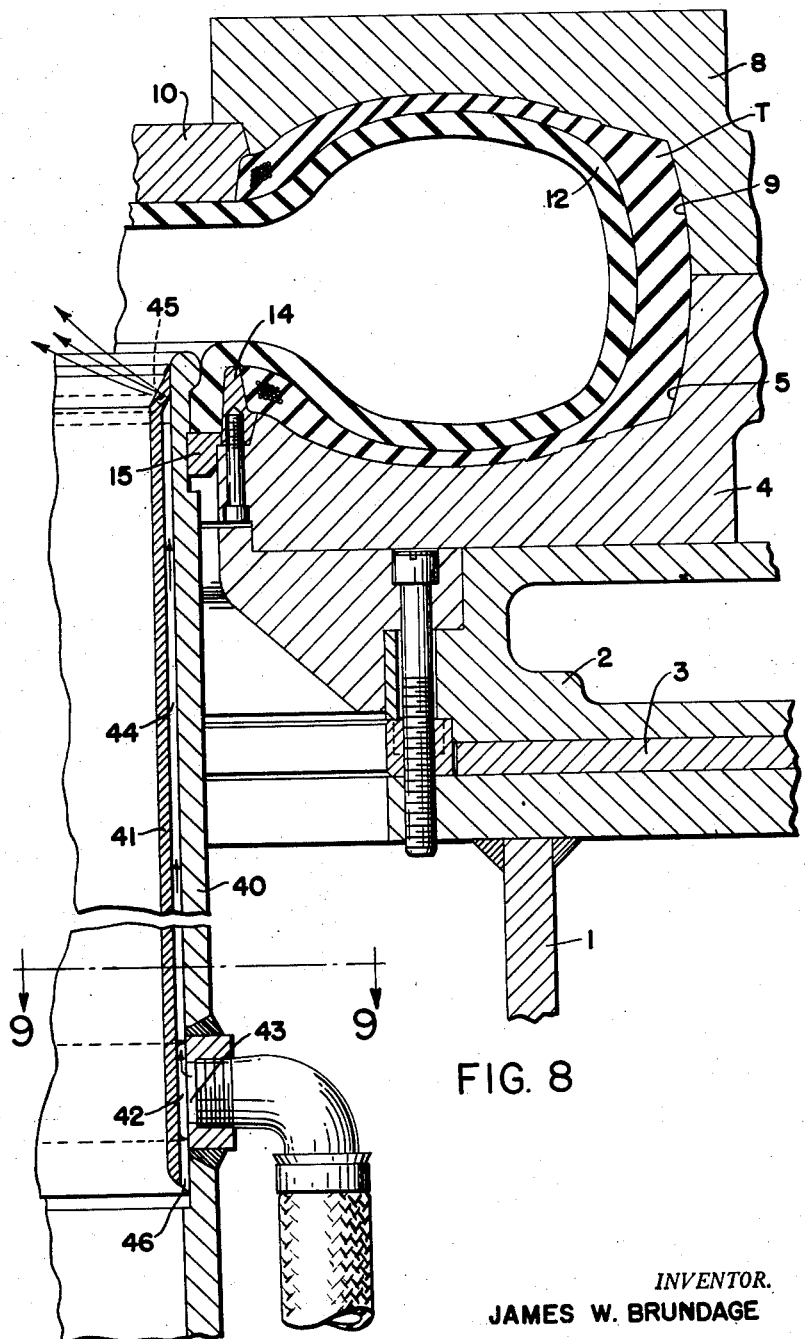
Fig. 8 is a cross-section view like Fig. 4 except illustrating a still further modification in the curing and cooling media supply arrangement.

Referring now to the operation of the press, the following example, using the reference numerals of Figs. 4 to 7, is typical in the shaping and curing of a conventional passenger car tire, such as 6.70–15, four-ply:

(1) When the mold sections 4 and 8 are spaced apart vertically, a green tire carcass in pulley-band form is positioned on the bottom bead ring 14, the diaphragm 12 then being in the well structure 30, turned inside out, as represented by dotted lines in Fig. 7.

(2) Now the top mold section 8 may be moved downwardly to contact the top bead of the carcass and to initiate "bellying" of the carcass and rolling of the beads thereof around the bead rings 10 and 14.

(3) During the initial stages of the downward movement of the top mold section 8, a valve (not shown) will be opened by suitable timing means (not shown) whereby steam under pressure is admitted through the inlet port 23 (Fig. 1), thus causing the diaphragm 12 to move upwardly and to be progressively laid against the partially bellied inside wall of the carcass, such movement continuing until the conical end thereof is seated in the conical recess in the top stripper bead ring 10.

(4) Thereafter, as the top mold section 8 continues to move downwardly, and as steam pressure is maintained in the diaphragm 12, the carcass will be progressively formed to tire shape.

(5) After the mold sections 4 and 8 have come together into mating engagement as shown in Fig. 4, other valves (not shown) are actuated and curing medium such as hot water at a pressure of around 200 to 250 p. s. i. and a temperature of around 320° F. is admitted through the inlet port 34. As evident, such hot water will flow through duct 33 and manifold 35 and will issue from the angularly disposed supply passages 31 and be directed against the upper half of the inner tire wall-contacting portion of the diaphragm 12; and, as a result, the hot water will swirl around in the diaphragm so as to heat the entire inner wall of the tire carcass T. As the hot water is being admitted, the air is displaced as though an orifice in the valve which controls the bottom port 26 (Fig. 1).

(6) After the curing medium has been thus circulated for a prescribed length of time to effect further expansion of the carcass into the anti-skid characters of the mold cavity and curing of the tire, the curing medium supply is cut off, and other valves (not shown) are actuated, whereby coolant such as water at a temperature of around 60–70° F. and 150–200 p. s. i. pressure is admitted through the inlet port 23, whereupon such coolant immediately commences to cool the cured tire T by directing the coolant directly against the inner wall of the tire-contacting portion of the diaphragm 12 and causing the swirling motion thereof around the diaphragm.

(7) After the cured tire has been cooled, the last-mentioned valves are operated to shut off the coolant supply, and a valve controlling port 26 is actuated to rapidly drain the coolant from within the diaphragm and the well.

(8) Thereafter, the push-down plunger 11 (Figs. 1 and 3) is actuated to peel off the diaphragm 12 progressively around the inner wall of the tire T; and, in order to prevent trapping of coolant in the duct 33, a bleed hole 36 may be provided.

(9) With the diaphragm 12 thus turned inside out, the push-down plunger 11 is retracted and the top mold section 8 is moved upwardly with respect to the bottom mold section 4. Before starting the operation of the press, the operator will have applied, either in the cavity 5 of the bottom mold section 4 or around the lower half of the pulley-band carcass, a special anti-sticking compound which prevents sticking of the tire T in the bottom mold section; and, therefore, as the top mold section 8 is moved upwardly, the tire T is stripped from the bottom mold section 4 and remains in the top mold section 8.

(10) At this stage of the operation, a suitable take-off platform or the like is inserted between the mold sections 4 and 8 underneath the vulcanized tire T; and, when the top mold section reaches its uppermost position, or even before, the upper stripper bead ring 10 is moved downwardly with respect to said top mold section to strip the tire T from the latter for discharge onto such platform or off-bearing device, whereupon the latter may then be withdrawn from the space between the mold sections.

(11) With the press in the open condition, the next pulley-band tire carcass is ready to be positioned on the bottom mold section in upright position, and before doing this, the operator may spray the anti-sticking compound into the mold cavity 5. In lieu of mold spraying, or in addition thereto, the operator may spray the lower half of the pulley-band tire carcass so that, when the carcass is shaped, the portion thereof which contacts the cavity 5 will strip therefrom rather than from the cavity 9 of the top mold section 8.

The foregoing steps are then repeated.

In general, the procedure for steam curing and water-cooling is the same as outlined above except that, when the mold sections have come into engagement, curing steam at a pressure of around 150–200 p. s. i. and a temperature of around 320° F. is admitted into the diaphragm by opening suitable valves. After the required curing cycle, the curing steam is cut off and a valve is opened to inject air at around 80–250 p. s. i. into the well and diaphragm to maintain pressure therein as the steam condenses and as the cooling water is started.

Thereafter, the air valve is closed, and cooling water valves are actuated so that water is sprayed against the tire-contacting wall of the diaphragm. The cooling cycle is usually about two minutes, and when the cooling water valves are closed, the drain valves controlling port 26 are opened to drain the cooling water and to reduce the pressure in the well and diaphragm prior to the stripping of the diaphragm from within the cured and cooled tire T. If the cooling water is run long enough, it will fill the well; and, therefore, it may be necessary to open the orifice drain valve sooner than just indicated.

By using the present invention, in which the coolant and curing medium are directed at the tire-contacting area of the diaphragm, the coldest or hottest fluid immediately commences to perform its intended function; and, moreover, more efficient heat exchange (cooling or heating) is effected by the swirling action of the coolant and curing media in the tire-contacting area of the diaphragm. Moreover, in steam curing of nylon tires as above outlined, pressure can be easily maintained to prevent collapse of the tire when changing from curing steam to cooling water.

There is also the feature of continuous circulation of the curing medium, hot water for example, in which the curing medium, after it has done its job, is allowed to pass through the orifice in the valve controlling the port 26 at a rate equal to the supply rate so as to maintain pressure with constant circulation. With the present improvements, it is possible, not only to reduce the shaping and curing cycle time by about 5–10%, but, in addition, to promptly arrest the cure at just the right time and to promptly commence the cooling of the tire so as to prevent overcuring. Thus, the productive capacity of the press is increased by the shortening of the cycle and by reduction in rejects due to undercuring and overcuring.

Other modes of applying the principle of the invention may be employed, change being made as regards the details described, provided the features stated in any of the following claims, or the equivalent of such, be employed.

I therefore particularly point out and distinctly claim as my invention:

1. A tire curing press comprising a base, a pair of complementary mold sections which are relatively movably mounted on said base into mating engagement whereat they define a tire-shaped cavity therebetween having spaced apart tire bead portions and to spaced apart position for insertion of an uncured tire carcass and for withdrawal of a cured tire carcass, a diaphragm adapted to be seated in said cavity, a member having a flange adapted to cooperate with a portion of said base and grip the bead portion of said diaphragm therebetween, and a series of circularly arranged, non-radial passages in said member that have axes tangent to a circle inside such bead portions for supplying temperature-modifying medium directly into said diaphragm, when seated in such cavity, from between said bead portions to thereby subject the interior wall of a tire carcass in such cavity to the heating or cooling influence of such medium, said circle being concentric to said bead portions and of sufficient diameter to induce circumferential swirling motion of the medium in such cavity along the inner circumference thereof.

2. A curing press of the type wherein a tire carcass is cured by circulation of fluid curing medium through a diaphragm in contact therewithin, a downwardly extending well to the mouth of which said diaphragm is secured, said well being formed with an upper portion having a flange adapted to cooperate with a portion of said press to grip the bead portion of said diaphragm therebetween, curing medium supply passages in said upper portion disposed to direct curing medium into the tire-contacting portion of said diaphragm and from which spent medium is displaced into said well over the mouth thereof, said passages being tangent to a circle concentric with a central axis of said well, said circle being of sufficient diameter to induce circumferential swirling motion of the curing medium in the tire-contacting portion of said diaphragm along the inner circumference thereof.

3. A curing press of the type wherein a cured tire carcass is cooled by circulation of a coolant through a diaphragm in contact therewithin, a downwardly extending well to the mouth of which said diaphragm is secured, said well being formed with an upper portion having a flange adapted to cooperate with a portion of said press to grip the bead portion of said diaphragm therebetween, coolant supply passages in said upper portion disposed to direct coolant into the tire-contacting portion of said diaphragm and from which spent coolant is displaced into said well over the mouth thereof, said passages being tangent to a circle concentric with a central axis of said well, said circle being of sufficient diameter to induce circumferential swirling motion of the coolant in the tire-contacting portion of said diaphragm along the inner circumference thereof.

4. The press of claim 2 wherein said passages direct curing medium non-radially upwardly and inwardly above the mouth of said well into the space within the tire-contacting portion of said diaphragm.

5. The press of claim 2 wherein said passages direct curing medium outwardly from the mouth of said well into the space within the tire-contacting portion of said diaphragm.

6. The press of claim 2 wherein said passages direct curing medium angularly upward and outward from the mouth of said well into the space within the tire-contacting portion of said diaphragm.

7. The press of claim 3 wherein said passages direct coolant non-radially upwardly and inwardly above the mouth of said well into the space within the tire-contacting portion of said diaphragm.

8. The press of claim 3 wherein said passages direct coolant outwardly from the mouth of said well into the space within the tire-contacting portion of said diaphragm.

9. The press of claim 3 wherein said passages direct coolant angularly upward and outward from the mouth of said well into the space within the tire-contacting portion of said diaphragm.

References Cited in the file of this patent

UNITED STATES PATENTS

| | | |
|---|---|---|
| 1,734,766 | Fetter | Nov. 5, 1929 |
| 1,892,942 | Gammeter | Jan. 3, 1933 |
| 2,559,119 | Frank | July 3, 1951 |
| 2,736,059 | Frank | Feb. 28, 1956 |
| 2,743,480 | Frank | May 1, 1956 |